United States Patent [19]
Dawes et al.

[11] Patent Number: 5,998,328
[45] Date of Patent: Dec. 7, 1999

[54] METHOD OF MAKING ACTIVATED CARBON-SUPPORTED CATALYSTS

[75] Inventors: Steven B. Dawes, Corning; Kishor P. Gadkaree; Tinghong Tao, both of Big Flats, all of N.Y.

[73] Assignee: Corning Incorporated, Corning, N.Y.

[21] Appl. No.: 09/162,114

[22] Filed: Sep. 28, 1998

Related U.S. Application Data

[60] Provisional application No. 60/061,483, Oct. 8, 1997.

[51] Int. Cl.⁶ .................................................. B01J 21/18
[52] U.S. Cl. ..................... 502/182; 502/180; 502/183; 502/184; 502/185; 502/402; 502/411; 502/418; 502/423; 502/427; 502/439
[58] Field of Search ..................... 502/180, 182, 502/183, 184, 185, 402, 411, 418, 423, 427, 439

[56] References Cited

U.S. PATENT DOCUMENTS

| | | |
|---|---|---|
| 3,885,977 | 5/1975 | Lachman et al. . |
| 3,979,329 | 9/1976 | Cooper ..................................... 502/184 |
| 4,127,691 | 11/1978 | Frost . |
| 4,482,641 | 11/1984 | Wennerberg ............................. 502/182 |
| 4,758,272 | 7/1988 | Pierotti et al. . |
| 4,992,233 | 2/1991 | Swaroop et al. . |
| 5,037,791 | 8/1991 | Comolli et al. ......................... 502/185 |
| 5,427,601 | 6/1995 | Harada et al. . |
| 5,451,444 | 9/1995 | DeLiso et al. . |
| 5,488,023 | 1/1996 | Gadkaree et al. . |
| 5,820,967 | 10/1998 | Gadkaree . |

*Primary Examiner*—Elizabeth D. Wood
*Attorney, Agent, or Firm*—L. Rita Herzfeld

[57] ABSTRACT

A method for making an activated carbon-supported catalyst involves providing an inorganic support having a continuous coating of activated carbon, activated carbon being derived from a synthetic carbon precursor, introducing a catalyst precursor into the pore structure of the activated carbon, and thermally treating the catalyst precursor to form an activated carbon-supported catalyst.

13 Claims, 3 Drawing Sheets

TEM OF SUPPORTED SYNTHETIC ACTIVATED CARBON
2,000,000X

TEM OF UNSUPPORTED SYNTHETIC ACTIVATED CARBON
2,000,000X

TEM OF ACTIVATED CARBON DERIVED FROM NATURAL SOURCES
2,000,000X

METHOD OF MAKING ACTIVATED CARBON-SUPPORTED CATALYSTS

This application claims the benefit of U.S. Provisional Application No. 60/061,483, filed Oct. 8, 1997, entitled "Method of Making Activated Carbon-Supported Catalysts", by Steven B. Dawes, Kishor P. Gadkaree and Tinghong Tao.

This invention relates to a method of making activated carbon-supported catalysts in which activated carbon derived from a synthetic carbon precursor is treated with a catalyst precursor.

BACKGROUND OF THE INVENTION

Metals such as transition metals, noble and base metals are used as catalysts in many chemical reactions. Catalysts generally increase the rate of chemical reaction which results in higher production rate in industry. Some catalysts are also used to drive reactions along a desired path, i.e., the catalysts make formation of certain chemicals energetically favorable over other chemicals.

In general, catalysts are expensive, and hence it is necessary to utilize a given amount of catalyst to its maximum potential. This is done by maximizing the catalyst surface area, i.e., by increasing its dispersion. Catalysts can be used as solids or liquids. The solid catalysts are generally supported on high surface area supports. The properties of the support become very important in such cases.

Activated carbon has also been used as a support for metal catalysts, e.g., noble metals, because of its very high surface area and other properties such as inertness. Such catalysts are used (powder or beads form) in various chemical and petrochemical reactions. These catalysts are normally made by dispersing noble metal particles on preformed activated carbon (incipient wetness technique).

The incipient wetness technique involves dispersing the activated carbon powders in a solution of a metal salt. The activated carbon powder is then impregnated with the solution. The powder is dried, and heated to appropriate temperature to decompose the salt to the desired metal or metal oxide catalyst. Multiple impregnations are usually required to obtain the desired quantity of catalyst on the activated carbon. Surface properties of activated carbon powders play a very important part in the dispersion of the metal catalyst obtained. Oxygen content and surface pH of the carbon powder has to be carefully controlled to obtain a good dispersion of the metal on the activated carbon. The various steps that are involved in this process result in a very expensive activated carbon supported catalyst. Thus, it is important to maximize utilization of the catalyst. Although carbon supported catalysts are commercially utilized, performance improvements are always sought after.

More recently, a method for producing a highly uniform dispersed catalyst on activated carbon is U.S. Pat. No. 5,488,023. This method involves combining a carbon precursor and a catalyst precursor, followed by curing, carbonizing, and activating the carbon precursor to produce a continuous uninterrupted activated carbon. The activated carbon with dispersed catalyst can be in the form of a coating on a substrate, granules, or a shaped monolithic body.

Despite the advantages provided by this latter method of combining catalyst and carbon precursors, the types and amounts of catalyst precursors are limited because care must be taken that the carbon and catalyst precursors are compatible and that the carbon precursor solution is not overly diluted with the catalyst precursor.

Therefore it would be advantageous to have a method of making an activated carbon supported catalyst that is flexible enough to accommodate a wide variety of metal catalysts and that produces a uniformly distributed catalyst.

The present invention provides such a method.

SUMMARY OF THE INVENTION

In accordance with one aspect of the invention, there is provided a method for making an activated carbon-supported catalyst that involves providing an inorganic supported catalyst having a continuous coating of activated carbon, the activated carbon being derived from a synthetic carbon precursor, introducing a catalyst precursor into the pore structure of the activated carbon, and thermally treating the catalyst precursor to form an activated carbon-supported catalyst.

DETAILED DESCRIPTION OF THE INVENTION

Figure 1:
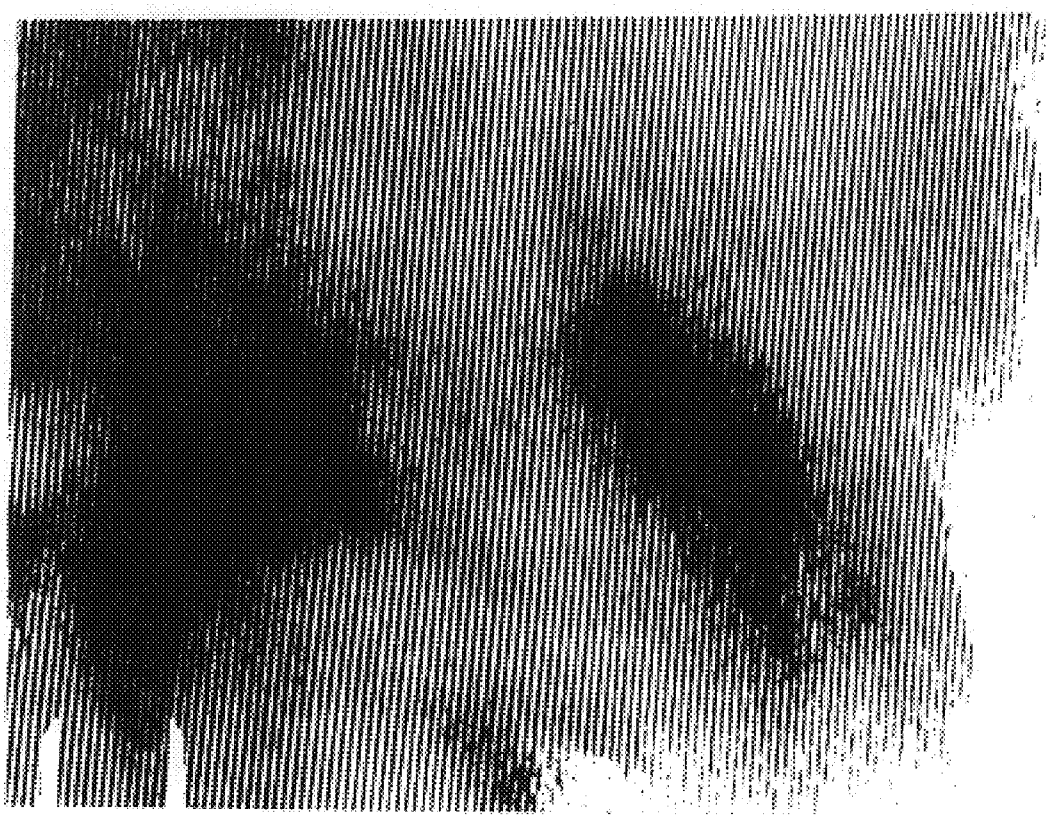
FIG. 1 is a Transmission Electron Micrograph (2,000,000×magnification) of continuous activated carbon coated onto a substrate, the carbon being derived from a synthetic carbon precursor, which is the carbon on which the catalyst is deposited according to this invention.

This invention relates to a catalyst and method of making it, in which a catalyst precursor is introduced into activated carbon that is coated onto an inorganic support. The activated carbon is derived from a carbon precursor, and therefore the activated carbon is continuous. The carbon precursor is synthetic.

By carbon precursor is meant a carbon-containing substance that converts to continuous structure carbon on heating. The carbon precursor can include any liquid or liquefiable carbonaceous substance. Examples of useful carbon precursors include crosslinkable resins such as thermosetting resins, thermoplastic resins (e.g., polyvinylidene, polyvinyl chloride, polyvinyl alcohol, and the like), furfuryl alcohol, and coal tar pitch.

Low viscosity carbon precursors (e.g., thermoset resins) are preferred especially when the precursor and catalyst are to be contacted with a substrate because their low viscosity allows greater penetration of the carbon precursor into the porosity of the substrate. Phenolic resins are most preferred due to their low viscosity, high carbon yield, high degree of cross-linking upon curing relative to other precursors, and low cost. Some phenolic resins that are especially suited are phenolic resole, plyophen (No. 43290), both supplied by Occidental Chemical Co., Niagara Falls, N.Y.

The carbon precursor used In the present method can include a single precursor material or a mixture of two or more precursor materials.

According to this invention, by activated carbon supported structure is meant that activated carbon is in contact with an inorganic material that supports it or gives it shape or strength. In a broad sense, the activated carbon can be thought of as a coating on the support or substrate. The resulting activated carbon coated support can take the form of powders, granules, or shapes such as pellets, or monoliths such as multicellular structures e.g. honeycombs. By monolith is meant a structure that functions in an application as a unitary or single body as opposed to multiple pieces that function in beds, such as granules, pellets, and powders. The activated carbon forms can be made by various techniques known in the art.

For example, activated carbon coated substrates in which the activated carbon is derived from a carbon precursor are described in U.S. Pat. No. 5,451,444 which is herein incorporated by reference.

An activated carbon coating derived from a carbon precursor extends over the outer surface of a porous substrate in the form of a substantially uninterrupted layer of carbon. This continuous carbon coating is anchored into the porosity and, as a result, is highly adherent. If interconnecting porosity is present in the substrate, an interlocking network of carbon will be formed within the composite, resulting in an even more adherent carbon coating. The uninterrupted carbon provides advantages of high activity despite a relatively low carbon content, high strength, and high use temperatures. It is preferred that the coating be no greater than about 1 mm thick. This is in contrast to discontinuous coatings, derived from for example, a slurry of binder and activated carbon particles. In slurry-coated structures, activated carbon is bound to the binder which in turn is bound to the substrate. As a result, binder particles are necessarily interdispersed through the carbon coating, rendering it discontinuous.

In general, activated carbon bodies or coatings derived from carbon precursors have distinct advantages over bodies and coatings made from activated carbon. Bodies made directly from activated carbon are made of discontinuous carbon which must be bound together by permanent binders; whereas resin-derived activated carbon bodies are made of continuous carbon and do not require permanent binders. This continuous carbon structure is strong and durable and can be used in high flow rate chemical processes. Such bodies also have durability in liquid streams. Bodies made from activated carbon particles are not durable in organic solvents and in many cases even in water, since the binder holding the structure together is water soluble. Coatings made of activated carbon particles are not as uniform or adherent as those derived from carbon precursors, and are more subject to erosion.

It is desirable that the overall open porosity of the substrate be at least about 10%, preferably greater than about 25% and most preferably greater than about 40%. For most purposes, the desirable range of porosity is about 45% to about 55%. Preferably the pores of the substrate material create "interconnecting porosity" which is characterized by pores which connect into and/or intersect other pores to create a tortuous network of porosity within the substrate.

The substrate must have enough strength to function in the application and be capable of withstanding the heat-treating temperature experienced in forming the activated carbon coating.

In its most useful form, the substrate is a monolithic substrate. Typical monolithic substrates have means for passage of a fluid stream therethrough, e.g., a network of pores communicating from the outside to the inside, and/or through channels extending from one end of the monolith to the other for passage of the fluid stream into one end and out through the other end.

Suitable porous substrate materials include ceramic, glass ceramic, glass, metal, clays, and combinations thereof. By combinations is meant physical or chemical combinations, eg., mixtures, compounds, or composites.

Some materials that are especially suited to the practice of the present invention, although it is to be understood that the invention is not limited to such, are those made of cordierite, mullite, clay, magnesia, and metal oxides, talc, zircon, zirconia, zirconates, zirconia-spinel, magnesium alumino-silicates, spinel, alumina, silica, silicates, borides, alumino-silicates, eg., porcelains, lithium aluminosilicates, alumina silica, feldspar, titania, fused silica, nitrides, borides, carbides, eg., silicon carbide, silicon nitride or mixtures of these. Cordierite is preferred because its coefficient of thermal expansion is comparable to that of carbon, increasing the stability of the activated carbon body. Some typical ceramic substrates are disclosed in U.S. Pat. Nos. 4,127,691 and 3,885,977. Those patents are W herein incorporated by reference as filed.

Suitable metallic materials are any metal or alloy or intermetallic compound that provides durable structural service, and does not soften below about 600° C. Particularly useful are alloys which are predominantly of iron group metal (i.e. Fe, Ni, and Co), either with carbon (e.g. steels, especially stainless or high temperature steels) or without carbon. Most typical of the latter alloys for higher temperature service are those consisting essentially of iron group metal and aluminum, with the preferred iron group metal being iron. Especially preferred is Fe, Al, and Cr. For example, Fe5-20Al5-40Cr, and Fe7-10Al10-20Cr powders with other possible additions are especially suited. Some typical compositions of metal powders for forming substrates are disclosed in U.S. Pat. Nos. 4,992,233, 4,758,272, and 5,427,601 which are herein incorporated by reference as filed. U.S. Pat. Nos. 4,992,233 and 4,758,272 relate to methods of producing porous sintered bodies made from metal powder compositions of Fe and Al with optional additions of Sn, Cu, and Cr. U.S. Pat. No. 5,427,601 relates to porous sintered bodies having a composition consisting essentially of in percent by weight about 5 to 40 Cr, about 2 to 30 Al, 0 to about 5 of special metal, 0 to about 4 of rare earth oxide additive and the balance being iron group metal and unavoidable impurities, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanide, Zr, Hf, Ti, Si, and B, with optional additions of alkaline earths, Cu, and Sn.

The substrate is preferably a honeycomb or matrix of thin walls forming a multiplicity of open ended cells extending between the ends of the honeycomb.

Generally honeycomb cell densities range from 235 cells/$cm^2$(about 1500 cells/$in^2$) to 1 cell/$cm^2$(about 6 cells/$in^2$). Some examples of commonly used honeycombs in addition to these, although it is to be understood that the invention is not limited to such, are about 94 cells/$cm^2$(about 600 cells/$in^2$), about 62 cells/$cm^2$(about 400 cells/$in^2$), or about 47 cells/$cm^2$(about 300 cells/$in^2$), and those having about 31 cells/$cm^2$(about 200 cells/$in^2$). Typical wall thicknesses are for example, about 0.15 mm for about 62 cells/$cm^2$(about 400 cells/$in^2$) honeycombs. Wall (web) thicknesses range typically from about 0.1 to about 1.5 mm. The external size and shape of the body is controlled by the application.

In another embodiment, coated monolithic substrates can be ground up to form granules.

The activated carbon can be in the form of a shaped monolith. This can be done by known methods of shaping mixtures of carbon precursor, binders and/or fillers that are at least inorganic, and forming aids, such as by extrusion. The inorganic fillers can be considered to be the supports or substrates for the activated carbon. Optionally, there can be organic fillers, but these would not be considered to be supports or substrates according to this invention.

Some fillers that are suited include both natural and synthetic, hydrophobic, and hydrophilic, fibrous and nonfibrous, carbonizable and non-carbonizable fillers.

Some inorganic fillers that can be used are oxygen-containing minerals such as clays, zeolites, talc, etc., carbonates, such as calcium carbonate, aluminosilicates such as kaolin (an aluminosilicate clay), flyash (an aluminosilicate ash obtained after coal firing in power plants), silicates, e.g. wollastonite (calcium metasilicate), titanates, zirconates, zirconia, zirconia spinel, magnesium aluminum silicates, mullite, alumina, alumina trihydrate, spinel, feldspar, attapulgites, and aluminosilicate fibers, cordierite powder, etc.

Some examples of especially suited inorganic fillers are cordierite powder, talcs, clays, and aluminosilicate fibers such as provided by Carborundum Co. Niagara Falls, N.Y. under the name of Fiberfax, and combinations of these. Fiberfax aluminosilicate fibers measure about 2–6 micrometers in diameter and about 20°50 micrometers in length.

For example some natural fillers are soft woods, e.g. pine, spruce, redwood, etc., hardwoods e.g. ash, beech, birch, maple, oak, etc., sawdust, shell fibers e.g. ground almond shell, coconut shell, apricot pit shell, peanut shell, pecan shell, walnut shell, etc., cotton fibers e.g. cotton flock, cotton fabric, cellulose fibers, cotton seed fiber, chopped vegetable fibers for example, hemp, coconut fiber, jute, sisal, and other materials such as corn cobs, citrus pulp (dried), soybean meal, peat moss, wheat flour, wool fibers, corn, potato, rice, tapioca, coal powder, activated carbon powder, etc. Some synthetic materials are regenerated cellulose, rayon fabric, cellophane, etc.

Some examples of carbonizable fillers that are especially suited for liquid resins are cellulose, cotton, wood, and sisal, or combinations of these, all of which are preferably in the form of fibers.

One especially suited carbonizable fiber filler is cellulose fiber as supplied by International Filler Corporation, North Tonawanda, N.Y. This material has the following sieve analysis: 1–2% on 40 mesh (420 micrometers), 90–95% thru 100 mesh (149 micrometers), and 55–60% thru 200 mesh (74 micrometer).

Hydrophobic organic fillers provide additional support to the shaped structure and introduce wall porosity on carbonization because in general they leave very little carbon residue. Some hydrophobic organic fillers are polyacrylonitrile fibers, polyester fibers (flock), nylon fibers, polypropylene fibers (flock) or powder, acrylic fibers or powder, aramid fibers, polyvinyl alcohol, etc.

Some binders that can be used are plasticizing temporary organic binders such as cellulose ethers. Some typical cellulose ethers are methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred.

Some binders and fillers that are especially suited are described in U.S. patent application Ser. No. 08/650,685, filed May 20, 1996. That application is herein incorporated by reference.

Some forming e.g. extrusion aids are soaps, fatty acids such as oleic, linoleic acid, etc., polyoxyethylene stearate, etc. or combinations of these. Especially preferred is sodium stearate. Optimized amounts of extrusion aid(s) depend on the composition and binder Other additives that are useful for improving the extrusion and curing characteristics of the batch are phosphoric acid and oil. Phosphoric acid improves the cure rate and increases adsorption capacity. It is typically about 0.1% to 5 wt. % in the mixture. The oil addition aids in extrusion and results in increase in surface area and porosity. Oil is added typically at about 0.1 to 5 wt. % in the mixture.

The oil must be water immiscible, so that with liquid resins it can form a stable emulsion. With solid resin, a suspension is formed. Some useful oils are petroleum oils with molecular weights from about 250 to 1000, containing paraffinic and/or aromatic and/or alicyclic compounds. So called paraffinic oils composed primarily of paraffinic and alicyclic structures are preferred. These can contain additives such as rust inhibitors or oxidation inhibitors such as are commonly present in commercially available oils. Some useful oil are 3 in 1 oil from 3M Co., or 3 in 1 household oil from Reckitt and Coleman In., Wayne, N.J. Other useful oils are synthetic oils based on poly alpha olefins, esters, polyalkylene glycols, polybutenes, silicones, polyphenyl ether, CTFE oils, and other commercially available oils. Vegetable oils such as sunflower oil, sesame oils peanut oil, etc. are also useful. Especially suited are oils having a viscosity of about 10 to 300 cps, and preferably about 10 to 150 cps.

The above ratios apply also to shaped activated carbon bodies. Generally the amount of activated carbon in the shaped body is about 10 to 98 wt %.

The carbon precursor is then subjected to heat-treatments to convert the carbon precursor to continuous carbon (carbonize). The resulting carbon is then heat-treated to activate the carbon and produce an activated carbon structure.

When the carbon precursor is a thermosetting resin, the carbon precursor is cured prior to activation and most typically prior to carbonization. The curing is accomplished typically by heating the precursor to temperatures of about 100° C. to about 200° C. for about 0.5 to about 5.0 hours. Curing is generally performed in air at atmospheric pressures. When using certain precursors, (e.g., furfuryl alcohol) curing can be accomplished by adding a curing catalyst such as an acid catalyst at room temperature.

Carbonization is the thermal decomposition of the carbonaceous material, thereby eliminating low molecular weight species (e.g., carbon dioxide, water, gaseous hydrocarbons, etc.) and producing a fixed carbon mass and a rudimentary pore structure in the carbon.

Such conversion or carbonization of the cured carbon precursor is accomplished typically by heating to a temperature in the range of about 600° C. to about 1000° C. for about 1 to about 10 hours in a reducing atmosphere (e.g. hydrogen), or inert atmosphere (e.g., nitrogen, argon, helium, etc.).

Curing and carbonizing the carbon precursor results in substantially uninterrupted carbon. Where the carbon is in the form of a coating, the carbon coating is anchored into the porosity of the substrate and as a result is highly adherent. The top surface of the carbon coating is an uninterrupted layer of carbon to carbon bonds. If interconnecting porosity is present in the substrate, an interlocking network of carbon will be formed within the composition, resulting in an even more adherent carbon coating. The coating of uninterrupted carbon extending over the outer surface of the substrate provides a structure with advantages of high strength and high use temperatures, and high catalytic capability despite a relatively low carbon content. Structures can be formed which contain carbon in an amount less than and up to about 50% often less than and up to about 30% of the total weight of the substrate and carbon.

The activating is done to substantially enhance the volume and to enlarge the diameter of the micropores formed during carbonization, as well as to create new porosity. Activation creates a high surface area and in turn imparts high adsorptive capability to the structure. Activation is done by known methods such as exposing the structure to an oxidizing agent such as steam, carbon dioxide, metal chloride (e.g., zinc chloride), phosphoric acid, at high temperatures (e.g., about 600° C. to about 1000° C.).

Figure 2:
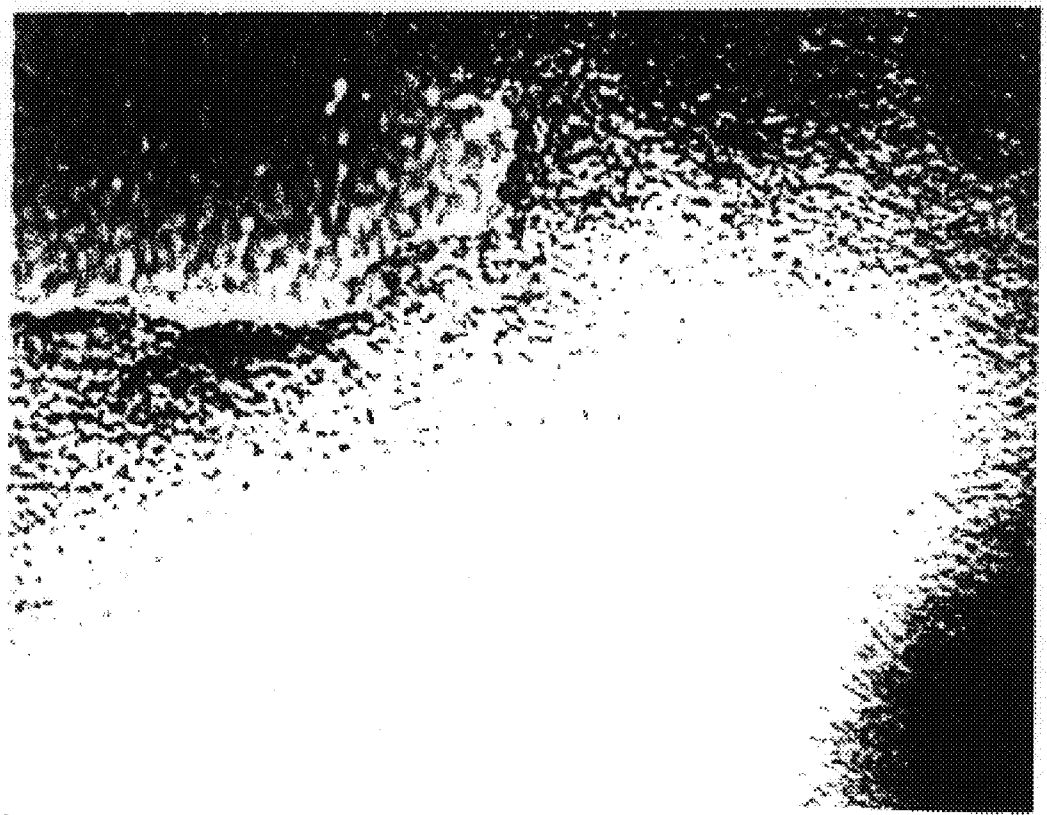
FIG. 2 is a Transmission Electron Micrograph (2,000,000×magnification) of continuous activated carbon derived from a synthetic carbon precursor, but which is unsupported.
Figure 3:
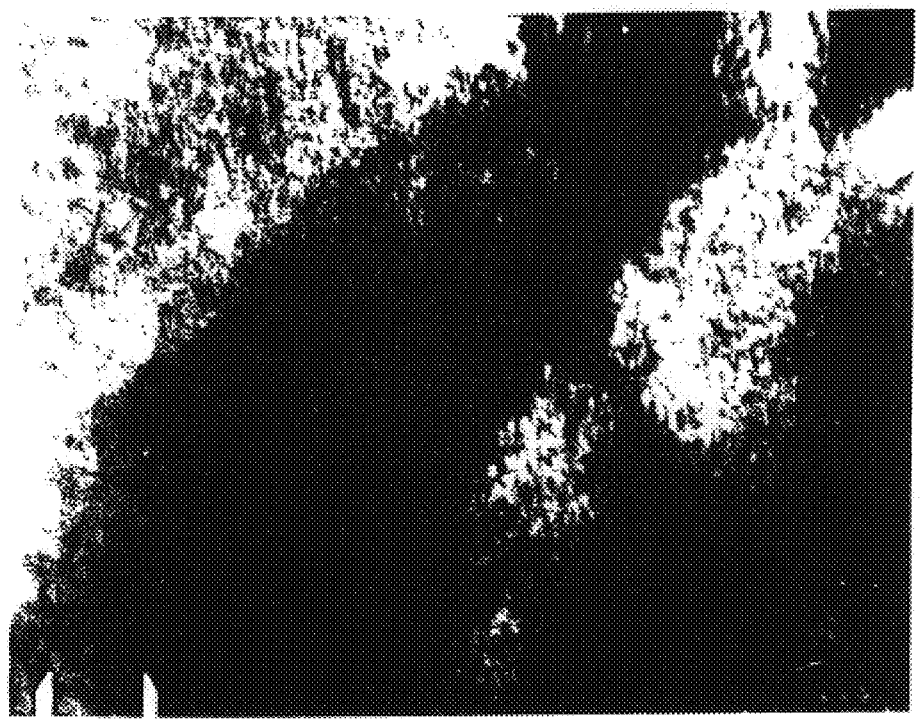
FIG. 3 is a Transmission Electron Micrograph (2,000,000×magnification) of commercial activated carbon derived from a natural source.

It has been found that fabricating the supported activated carbon from synthetic precursors on inorganic substrates results in a surprisingly different and unique nanostructure than is observed with activated carbon obtained from natural carbonaceous materials. This can be seen from a comparison of the Transmission Electron Micrographs shown as FIGS. 1 and 3. FIG. 1 is activated carbon as a continuous coating derived from a synthetic carbon precursor, on an inorganic substrate. FIG. 3 is activated carbon derived from a natural source. The Micrograph of FIG. 1 is even different from that of FIG. 2 which is unsupported activated carbon derived from a synthetic carbon precursor.

The TEM of the supported synthetic carbon shows a very regular structure of graphitic platelets with porosity in between. The pore width is uniform and of the order of about 0.8 nanometers, The Transmission Electron Micrographs of unsupported synthetic carbon and natural source based carbon both show random structure. The uniformity seen in the supported synthetic carbon is not present in this case, clearly showing the nanostructural differences. Such differences affect the distribution of catalysts on these forms and hence there functioning. Catalysts are more uniformly distributed on the activated carbon of FIG. 1 and hence function more efficiently.

Furthermore, the method of producing the supported activated carbon according to this invention which requires already-formed continuous carbon offers greater flexibility as far as types and amounts of catalyst precursor, than first mixing the catalyst precursor with a carbon precursor (before carbonization and activation). In this latter process, the type and amount of catalyst precursor is somewhat dependent on the limits of solubility or miscibility of the catalyst precursor with the carbon precursor solution. If the catalyst and/or carbon precursor solutions are too dilute, the proper loading of carbon precursor and/or catalyst precursor will be limited. The method of the present invention removes those limitations because the amount of catalyst is not dependent on a carbon precursor solution but only on the available sites and surface chemistry on the already-formed continuous activated carbon. The substrates can be chemically or physically modified for the purpose of reaction without limitations that would be present if the catalyst were already present in the pores.

The catalyst is chosen to fit the desired application, e.g., oil refinement, chemical synthesis, pollution abatement as automotive exhaust purification, etc.

The catalyst precursor is most typically a compound e.g. organic or inorganic salt of a catalyst metal which decomposes to the catalyst metal or catalyst metal oxide on heating. Inorganic compounds can be e.g., oxides, salts such as chlorides, nitrates, carbonates, sulphates, complex ammonium salts, etc. Organic compounds can be e.g., organometallic salts of the appropriate type.

Typical catalyst metals are transition metal, alkali metal, alkaline earth, or combinations of these. Most useful are the noble metals, base metals or any combination of these. Advantageously the catalyst metals are Pt, Pd, Rh, Zn, V, Ag, Au, Fe, Co, Cr, Ni, Mn, Cu, Li, Mg, Ba, Mo, Ru, Os, Ir, or combinations of these. Some examples of catalyst metals, although this list is not all inclusive, are V, Co, Cu, Ni or Fe oxides, for $NO_x$ and $SO_x$ conversion, noble metals and Cu, Zn, Co, Ni, Mn, Cr, Fe, for a variety of chemical reactions, etc.

Prior to introducing the catalyst precursor into the pores of the above described forms of activated carbon, the surface of the activated carbon may need to be treated either physically to modify the surface chemistry of the carbon, by e.g. heat treatments, or chemically.

Chemical treatment generates the anchor sites (chemisorption active sites) on the carbon surface to grasp or attract catalyst precursors in the liquid phase during catalyst preparation. As a result, catalyst precursors are chemically bonded to the carbon surface and therefore catalyst stability and chemically durability are improved. Typical treatments include oxidation such as gas phase oxidation in air or oxygen-containing gases and liquid phase oxidation in nitric acid, hydrogen peroxide, etc. to provide a highly oxygenated surface and/or other surface functionalities such as sulfur, nitrogen-containing groups via reaction in gas or liquid phase. These processes are not expected to alter the underlying nanostructure of the supported activated carbon. Depending upon the application, the surface functionality may be detrimental to catalytic reactions in some cases. If so, the surface functionality, particularly oxygen surface functional groups can be removed by thermal treatment in inert gases such as nitrogen, argon, helium; or hydrogen; or vacuum.

The catalyst precursor is introduced into the pores of the above described forms of activated carbon treated as described above. The thin layer of activated carbon on the surface of the substrate results in very short mass transfer distance inside the pores. The catalyst precursor solutions thus penetrate the pores uniformly and the precursor is easily adsorbed on the entire internal (inside of the pores) and external surface of the activated carbon. In contrast, the catalyst precursors are not uniformly distributed on commercial microporous granular activated carbon due to long transport distance in each particle.

Introducing the precursor into the pores of the activated carbon can be done by any one of several feasible techniques.

One technique, for the purposes of this invention termed liquid infiltration, involves washing over dry activated carbon a solution of a metal salt dissolved in a solvent. The activated carbon is then removed from excess solution and placed in an oven to evaporate the solvent. The metal salt remains in the pore structure of the carbon and can be treated to form the catalyst metal.

Another technique, termed the incipient wetness technique, which is the preferred method, differs from the liquid infiltration technique in a subtle way. The activated carbon is immersed in an appropriate amount of solvent, such as water. The activated carbon surface attracts the precursor solute from the solution into its micropores. After soaking, the activated carbon is dried. Thermal treatments to convert the precursor to the catalytically active phase completes the process.

Sometimes hydrogen or other reducing agents are necessary to convert metal oxide to metallic phase if only the metallic phase is active in a reaction.

The present invention has several advantages, namely, (1) when the carbon precursor is a liquid phase thermoset resin, such as a phenolic resin, it is highly amenable to making coatings on porous refractory supports, (2) when supported activated carbon is made as a coating on a monolithic substrate, it provides conductive layers that can be resistively heated to provide thermal energy for reactions, (3) the process is general for a wide range of precursors for many catalysts, (4) synthetic activated carbon provides unique nanostructural properties for catalytic reactions because of associated surface chemistry, (5) a very thin layer of activated carbon film, e.g. no greater than about 1 mm thick, provides not only efficient mass and heat transfer but also uniform distribution of catalyst throughout the carbon body, (6) the impurities are minimized because of use of a synthetic carbon precursor.

To more fully illustrate the invention, the following non-limiting examples are presented. All parts, portions, and percentages are on a weight basis unless otherwise stated.

A gas phase hydrogenation reaction, that of toluene hydrogenation was used to demonstrate the performance of the catalyst of the present invention because of the industrial importance of this reaction and because optimized commercial catalysts are available to compare the performance of the catalyst of the present invention with the industry standard.

Experiments were carried out in a standard fixed bed reactor. Hydrogen is fed continuously, in amounts considerably in excess of stoichiometric amounts. Toluene is fed continuously by liquid syringe pump. The commercial carbon catalyst was about 40–60 mesh size.

The reaction conditions were as follows. Temperatures are in degree Celsius unless otherwise stated. All the hydrogenation experiments were conducted in a reactor having about 1.27 cm (0.5") outside diameter and a length of about 45.72 cm (18"). The reactor was constructed from 316 stainless steel tubing, wall thickness of about 0.159 cm (0.0625"), I.D. about 0.953 cm (0.375"). The reactor volume was calculated based on the catalyst packed volume. For all the examples, the packed bed length was about 5.08 cm (about 2"). Void volume was filled with inert glass wool and 40–60 mesh cordierite. The resultant catalyst reaction volume was calculated to be about 3.62 cc, which is the value used for determining the contact time.

The reactor was operated in a co-current horizontal flow mode. Liquid toluene and hydrogen were metered separately, and then introduced into a mixing tee at the base of the reactor. Intimate mixing, as well as preheating, was accomplished in the inert, packed bed section. Products as well as excess hydrogen and unreacted reactants flew into a heated six-port valco valve for complete composition analysis.

The toluene was from 99.9% analytical grade toluene (Aldrich Chemical Co.). The hydrogen was from 99%+ purity hydrogen cylinders and then further purified by moisture and oxygen trap. The hydrogen feed rate was about 50 cc/min (STP) which is equivalent to a hydrogen space-time of about 0.05 minute at reaction conditions, i.e. 1 atm. and about 100° C. Hydrogen space-time was about 0.05 minute. The unit in which the "Space Time Yield" is expressed in the examples is: Mol Product/g Pt/min. This is the yield of product based on equivalent weight of noble metal per unit time.

Comparative Example 1

A 1% Pt/carbon-supported commercial catalyst (1% Pt/C and about 10 mesh in particle size, optimized catalyst for hydrogenation) was provided in dried base, having a surface area of about 800 $m^2/g$ and pore volume of about 0.6 c/g. After grinding into powder form (about 200 mesh) to increase the accessibility of the catalyst to the reactants, about 0.25 g of the catalyst mixed with about 2.10 g of about 40–60 mesh cordierite (total sample volume of about 3.62 cc) was charged to a 1.27 cm (0.5") diameter reactor. The sample was reduced by being first heated at about 150° C. in flowing $N_2$(50 cc/min) for one hour, then heated at about 150° C. in flowing $N_2/H_2$(about 50:50 mole ratio, about 100 cc/min) for about 1 hour, and finally heated at about 400° C. in flowing $N_2/H_2$(about 50:50 mole ratio, about 100 cc/min) for about 2 hours. This is the standard procedure used to reduce the catalyst. The sample was cooled rapidly to about 100° C. in the $N_2/H_2$ atmosphere. After at least 30 minutes in flowing $N_2$ at about 100° C., the toluene feed rate was adjusted to give contact time of about 6.0 hours (for example, a toluene feed rate of about 0.01 cc/min gives a contact time of about 6.0 hours) and the hydrogen flow rate adjusted to give a hydrogen space-time of about 0.05 minute. The hydrogenation reaction was carried out at a reaction temperature of about 100° C. The reaction product was sampled continuously to GC for analysis using a six-port gas phase automatic sampling valve. The reaction product distribution is an average of several measurements taken after steady-state conditions were reached. The conversion of toluene to methyl-cyclohexane was about 7.13%, corresponding to about $4.02 \times 10^{-5}$ mol/g Pt/min.

Comparative Example 2

About 1% Pt/carbon-supported (1% Pt/C) and about 1% Pt/K-alumina supported commercial catalysts (both in powder form) were provided in dried base, having a surface area and pore volume of about 800 $m^2/g$ of about 0.6 cc/g (1% Pt/C) and about 230 $m^2/g$ and about 0.5 cc/g (about 1% Pt/$Al_2O_3$) respectively. About 0.25 g of tie catalyst mixed with about 2.10 g of about 40–60 mesh cordierite (total sample volume of about 3.62 cc) was charged to a 1.27 cm (0.5") diameter reactor. Hydrogenation and catalyst pretreatment were carried out as described in Example 1. The result shows that the conversion of toluene to methyl-cyclohexane was about 3.87% and about 5.10% for 1% Pt/C and 1% Pt/$Al_2O_3$ respectively. They correspond to about $1.42 \times 10^{-5}$ and about $1.90 \times 10^{-5}$ mol/g Pt/min in space-time yield.

Comparative Example 3

A 1.5% Pt/carbon-supported commercial catalyst (about 1.5% Pt/C, powder form) was provided in wet base, having a surface area of about 800 $m^2/g$ and pore volume of about 0.6 cc/g. The catalyst was dried under flowing $N_2$ at about 100 ml/min at about 150° C. for about 2 hours and cooled down to room temperature. About 0.16 g of the catalyst mixed with about 2.20 g of 40–60 mesh cordierite (total sample volume of about 3.62 cc) was charged to a 1.27 cm (0.5") diameter reactor. Hydrogenation and catalyst pretreatment were conducted as described in Examples 1 and 2. The result shows that the conversion of toluene to methyl-cyclohexane was about 11.50% corresponding to $4.32 \times 10^{-5}$ mol/g Pt/min.

Inventive Example 1

Carbon-impregnated honeycombs (CIH) were fabricated according to methods described in U.S. Pat. No. 5,451,444 by coating a thermosetting phenolic resole resin onto a cordierite honeycomb, which was then cured, carbonized, and activated at about 900° C. in carbon dioxide until a burnoff on activation of about 19.8% was obtained. As FIG. 1 shows a unique regularly spaced graphitic platelet type microstructure with a platelet distance of about 0.7 to 1.5 nanometers as opposed to amorphous structures exhibited by other activated carbon forms. A comparison of FIGS. 1 and 3 shows the startling difference between the supported activated synthetic carbon of this invention and previously available activated carbon. The figures show the nanostructure of synthetic activated carbon grown on a support versus commercial carbon from natural sources. The carbon-impregnated honeycombs were then impregnated with Pt precursor using the incipient wetness impregnation method. Dihydrogen hexachloroplatinic acid was used as a Pt precursor. About 1% of Pt was loaded onto the carbon of the carbon-impregnated honeycomb, i.e., Pt to carbon weight ratio was about 0.01. The sample was dried in air at about 120° C. overnight. After calcination at about 400° C. for about 2 hours in inert gases, the sample was cooled down to room temperature and stored in air for future use. The reason for using the Pt/C ratio of 0.01, which is identical to commercial Pt/C catalysts in Comparative Examples 1 and 2 is that the Pt/C ratio is a primary factor in determining Pt dispersion on carbon.

Two pieces, about 1.20 g in total weight, of Pt-loaded carbon-impregnated honeycombs measuring about 9.5 mm (⅜") in diameter and about 2.54 cm (1") in height were charged into a 1.27 cm (0.5") diameter fixed bed reactor. The total amount of platinum in the two pieces of platinum-loaded honeycombs was equivalent to the amount of platinum charged in the reactor in Comparative Examples 1–3. Hydrogenation reaction with an appropriate pretreatment was carried out as described in Comparative Examples 1–3. The experimental results are given below. The carbon-impregnated honeycomb sample resulted in a yield of about $1.37 \times 10^{-3}$ mole product/g Pt/min.

It can be seen that the product yield (space time yield) over Pt-Carbon-impregnated honeycombs catalysts is about 5–10 times higher than the commercial catalysts described in Comparative Examples 1–3. The carbon-impregnated sample preparation parameters, in particular the burn-off levels, have a significant influence on their catalytic performance.

Inventive Example 2

A catalyst-impregnated CIH sample was prepared identical to Inventive Example 1, but with about 67.8%. burn-off on activation. This sample in the identical reaction carried out in Inventive Example 1 showed a conversion of toluene of about $3.83 \times 10^{-4}$ mole product/g Pt/min, lower than Inventive Example 1, but significantly higher than all the commercial carbon supported catalysts of Comparative Examples 1–3.

Inventive Example 3

A catalyst sample similar to Inventive Example 2 but with about 30.3% activation burnoff was made and subjected to the same performance evaluation as in Inventive Example 1. The conversion was about $3.08 \times 10^{-3}$ mole product/g Pt/min. Again this is an order of magnitude greater than all the commercial catalysts of Comparative Examples 1–3.

Inventive Example 4

To evaluate the effect of catalyst physical shapes on its performance, the fresh catalyst sample in Inventive Example 3 was crushed into powder forms (about 200 mesh). Hydrogenation reaction with an appropriate pretreatment was carried out as described in Comparative Examples 1–3 and Inventive Examples 1—3. The result indicates that the conversion of toluene to methyl-cyclo-hexane was about 41.52%, corresponding to about $1.66 \times 10^{-3}$ mol/g Pt/min. The conversion obtained in this reaction with the powder form of the catalyst was about half of that obtained with the honeycomb form for the same conditions and weight of Inventive Example 3. This suggests that the monolithic shape is advantageous in catalytic reaction over packed bed reactor under identical conditions.

This substantial improvement in performance is believed to be due to two factors. The first is the unusual nanostructure developed by this synthetic carbon as a result of deposition on a cordierite substrate. Another factor that causes the high performance is believed to be the thin layer of carbon-containing platinum that allows catalysts to be approached by the reactants with minimum diffusional resistance. FIGS. 1 and 3 show the difference between the nanostructures of the carbon utilized in this invention and the commercial carbon. The difference is because of the way the synthetic carbon is formed on the surface of a substrate versus commercial carbon formed from natural sources such as wood, etc.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method of making an activated carbon-supported catalyst, the method comprising;
   a) providing an inorganic support having a continuous coating of activated carbon wherein the activated carbon is derived from a synthetic carbon precursor by steps comprising carbonizing, and activating the precursor to form said continuous coating of activated carbon;
   b) introducing a catalyst precursor into the pore structure of the activated carbon; and
   c) thermally treating the catalyst precursor to form an activated carbon-supported catalyst.

2. A method of claim 1 wherein the support is selected from the group consisting of ceramic, glass, glass ceramic, molecular sieve, and combinations thereof.

3. A method of claim 2 wherein the support is selected from the group consisting of cordierite, mullite, alumina, zeolite, and combinations thereof.

4. A method of claim 1 wherein the support is in the form of a monolithic multicellular structure.

5. A method of claim 1 wherein the carbon precursor is a crosslinkable resin.

6. A method of claim 5 wherein the crosslinkable resin is a phenolic resin.

7. A method of claim 4 wherein the activated carbon coating thickness is no greater than about 1 mm.

8. A method of claim 1 wherein the catalyst is a metal selected from the group consisting of noble, transition, alkali, alkaline earth, and combinations thereof.

9. A method of claim 1 wherein the catalyst precursor is in the form of one or more metal salts.

10. A method of claim 1 wherein the activated carbon is first treated before introducing the catalyst precursor by a treatment selected from the group consisting of heat treatment and chemical treatment.

11. A method of claim 1 wherein the catalyst precursor is introduced into the activated carbon by a physical process.

12. A method of claim 1 wherein the catalyst precursor is introduced into the activated carbon by a chemical process.

13. A method of claim 1 wherein the catalyst precursor is provided in an amount sufficient to result in about 0.1% to 20% of the weight of the activated carbon.

* * * * *